(No Model.)
F. A. NEIDER.
COASTING FOOT REST FOR BICYCLES.
No. 593,678. Patented Nov. 16, 1897.
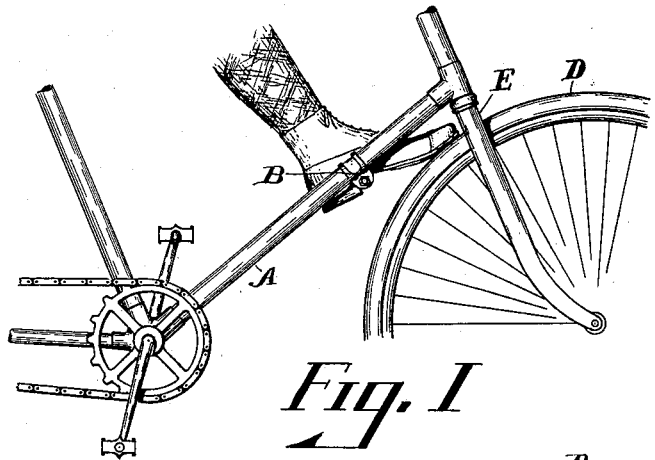
*Fig. 1*
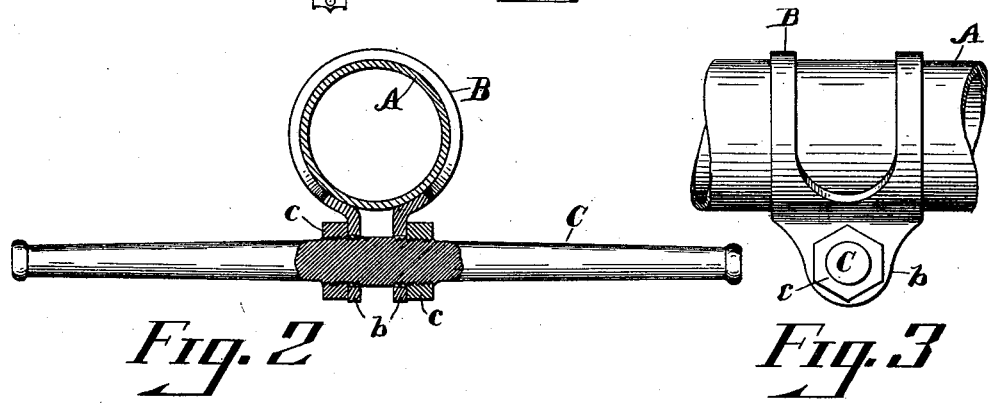
*Fig. 2*  *Fig. 3*
WITNESSES
Sherwood R. Taylor
Emma Lyford
INVENTOR
Fred A. Neider
By Geo. D. Murray
Atty

UNITED STATES PATENT OFFICE.

FRED A. NEIDER, OF AUGUSTA, KENTUCKY.

COASTING FOOT-REST FOR BICYCLES.

SPECIFICATION forming part of Letters Patent No. 593,678, dated November 16, 1897.

Application filed September 21, 1896. Serial No. 606,524. (No model.)

*To all whom it may concern:*

Be it known that I, FRED A. NEIDER, a citizen of the United States, and a resident of Augusta, in the county of Bracken and State of Kentucky, have invented certain new and useful Improvements in Coasting Foot-Rests for Bicycles, of which the following is a specification.

The object of my invention is to provide a coasting-rest for bicycles so disposed upon the frame of the wheel that the rider may regulate its speed when going downgrade by applying the toe of the shoe or shoes as a brake to the front or steering wheel, thus leaving the steering-wheel fork unobstructed and under easy control of the handle-bars.

The invention consists in the peculiar combination and arrangement of parts illustrated in the accompanying drawings, described in the specification in connection therewith, and particularly referred to and pointed out in the annexed claims.

Figure 1 is a side elevation of so much of a bicycle as is necessary to illustrate my improvement, which is attached thereto. Fig. 2 is a detail view, upon an enlarged scale, partly in elevation and partly in axial section, of the preferred form of my invention applied to the lower bar of the frame. Fig. 3 is a side elevation of the same.

The preferred form of my invention is adapted to be readily applied to the lower bar A of the bicycle-frame and may be applied to any of the frames now in common use.

In Figs. 1 to 3, inclusive, B is a clip or band of steel or other suitable metal, having downwardly-projecting perforated lugs $b$ to pass the foot-bar C. The clip is adapted to spring over the lower frame-bar A and bind tightly upon it, the band portion being cut away for lightness and to permit it to spring freely over the said bar, while the lugs and the part above it are left solid for rigidity. The clip is tightened firmly upon the bar A, when adjusted to the proper position, by two nuts $c$, which are tightened up against the outside of the lugs upon the central screw-threaded portion of the bar C.

It will be seen from an examination of Fig. 1 that when the wheel is descending a grade the rider may place his feet upon the projecting ends of the bar C, and these, serving as a rest, permit him to rock the toe or toes of his shoes with any pressure desired upon the tire D, thus acting as a brake to slacken his speed, while leaving the front-wheel fork E under complete control of the handle-bar. (Not shown.)

Instead of providing two nuts $c$ to engage the centrally-threaded portion of the bar C to clamp the device firmly upon the lower bar A the said bar C may have a collar formed upon it and only one nut to force the lugs $b$ together and clamp the band of the clip upon the bar A; but it is preferable to use two nuts.

It is obvious that the foot-bars may be formed integral with the lower frame-bar A; but this would be an inferior modification, as it is desirable that the foot-rest be adjustable along the bar to suit the convenience of the rider. In such case it would be necessary to have a special bar, while in the form shown the attachment may be made and sold as a separate article and readily applied by any one to any of the wheels now in ordinary use.

What I claim is—

1. As a new article of manufacture, the spring-metal clip-bar formed to embrace the lower bar of the bicycle-frame, and having downwardly-projecting perforated lugs, the foot-rest bar centrally screw-threaded to pass through said lugs and tightening-nuts engaging said screw-threaded portion to clamp the device upon said frame-bar, substantially as set forth.

2. The hereinbefore-described coasting foot-rest for bicycles, comprising a spring-metal clip having its web cut away to form bands upon each side of it and perforated lugs to pass the foot-rest bar, the foot-rest bar adapted to pass through said lugs and having its central portion screw-threaded, and tightening-nuts to engage the screw-threads upon said bar and clamp or release the clip from the lower frame-bar, substantially as shown and described.

FRED A. NEIDER.

Witnesses:
R. L. TAYLOR,
S. F. ANDERSON.